United States Patent [19]
Romines

[11] Patent Number: 5,881,139
[45] Date of Patent: Mar. 9, 1999

[54] APPARATUS AND METHOD FOR OPTIMIZING THE USE OF LONG DISTANCE TELEPHONE SERVICES

[76] Inventor: Gregory Romines, 3906 Oak Creek Dr., Austin, Tex. 78727

[21] Appl. No.: 748,841

[22] Filed: Nov. 14, 1996

[51] Int. Cl.$^6$ .................................................... H04N 15/00
[52] U.S. Cl. .......................... 379/130; 375/140; 375/112; 375/355; 375/115
[58] Field of Search .................................... 379/112, 113, 379/130, 131, 140, 141, 355, 114, 115, 120, 121, 127, 356, 357

[56] References Cited

U.S. PATENT DOCUMENTS

| | | | |
|---|---|---|---|
| 4,751,728 | 6/1988 | Treat | 379/113 |
| 4,813,065 | 3/1989 | Segala | 379/130 |
| 5,400,395 | 3/1995 | Berenato | 379/130 |
| 5,425,085 | 6/1995 | Weinberger et al. | |
| 5,519,769 | 5/1996 | Weinberger et al. | 379/130 |
| 5,638,433 | 6/1997 | Bubien, Jr. et al. | |

*Primary Examiner*—Paul Loomis
*Attorney, Agent, or Firm*—Shaffer & Culbertson, LLP; Russell D. Culbertson

[57] ABSTRACT

An apparatus for placing a toll telephone call using a lowest cost long distance carrier includes a telephone input for operatively connecting to a telephone or other dialing equipment at a user's location, and a line output for operatively connecting to a public telephone network. The apparatus further includes an arrangement for capturing preferably each number dialed through the user's telephone dialing equipment. Rate storage within the apparatus stores long distance rate information for a plurality of carriers and clock produces a time input representing the time of day and day of week. The apparatus further includes a rate comparison arrangement connected to the rate storage, clock, and input number capture mechanism for determining from the stored long distance rate information the identity of the long distance carrier having the lowest long distance rate for the telephone call represented by the captured telephone number. The device further includes a dialing mechanism for dialing the captured telephone number and specifying for the dialed number the long distance carrier to be used for the particular call. A cut-through mechanism connects the telephone to the telephone network once the device dials the toll number. The apparatus further includes a rate update arrangement which communicates with a database at a remote location over the public telephone network to which the device is connected. The update arrangement receives from the remote location current long distance rate information and causes the information to be stored in the long distance rate storage.

14 Claims, 5 Drawing Sheets

APPARATUS AND METHOD FOR OPTIMIZING THE USE OF LONG DISTANCE TELEPHONE SERVICES

BACKGROUND OF THE INVENTION

This invention relates to long distance telephone communication services. More particularly, the invention relates to an apparatus for placing long distance telephone calls using a lowest cost long distance carrier. The invention also includes a method for placing long distance calls through a lowest cost long distance carrier.

Since deregulation in the long distance telephone communications industry, numerous long distance providers or carriers have entered the market to provide long distance services. Commonly, a telephone user will choose a long distance carrier when the user initiates telephone service at a particular location. This carrier serves a default carrier and all "one-plus" long distance calls from the user's location are made through that particular long distance carrier. However, the long distance user is not limited to the default carrier. The North American Telecommunications Network is set up so that a user may dial a carrier identification code prior to dialing the long distance number and the subsequent long distance number will then be placed through a carrier identified by the code number. By using a carrier identification code or CIC, a telephone user may use any of a large number of long distance carriers. These different carriers commonly have different rates for calls to a given target location.

It is difficult, if not impossible, for a user to keep up with changing long distance rates, and always know which carrier to choose to obtain the best rate for a particular call. Long distance carrier rates change regularly. Also, the best rate for a particular call depends upon the time of day, day of week, location of the user, and location of the target number. Furthermore, carrier identification codes are inconvenient in that they require dialing extra numbers in addition to the normal long distance number. It is difficult enough simply to remember to dial a particular carrier identification code, let alone choose a carrier identification code which will result in a lowest rate for the desired call.

SUMMARY OF THE INVENTION

It is an object of the invention to overcome the above-described problems and others associated with utilizing long distance carriers. More specifically, it is an object of the invention to provide an apparatus which is connected to the user's telephone at the user's location and which places each long distance call made from the user's phone through a lowest cost long distance carrier for the particular call. Another object of the invention is to provide a method for placing long distance calls through a lowest cost long distance carrier.

In order to accomplish these objects, the invention includes a redialing apparatus connected to the user's telephone dialing equipment at the user location. The redialing apparatus includes storage for storing long distance rate information for a plurality of carriers and further includes rate comparison means for identifying the long distance carrier in the stored information which has the lowest rate for a particular call to a target location. The redialing apparatus also includes dialing means for redialing the long distance call through the identified long distance carrier. Since long distance rates change regularly, the redialing apparatus also includes rate update means for communicating periodically with a database at a remote location to obtain current long distance rate information to be stored in the storage associated with the redialing apparatus. The remote location maintains current long distance rate information for each exchange and each area code within a service area. The service area is preferably national, but may be broader or narrower within the scope of the invention.

According to the method of the invention, the user dials a telephone number in the normal fashion through the user's telephone dialing equipment. The user's telephone dialing equipment may be a telephone, facsimile machine, modem, or TDD device. The telephone dialing equipment at the user's location is connected to a telephone line input of the redialing apparatus, and the redialing apparatus is in turn connected to a public telephone communications network through a telephone line output.

The redialing apparatus captures the dialed telephone number with input number capture means connected to the telephone line input. If the dialed number is not a long distance or toll number, the redialing apparatus simply redials the number immediately through the dialing means associated with the redialing apparatus. Once the number is redialed, the redialing apparatus connects the telephone line input to the line output through cut-through means for enabling normal telephone line communications between the network and the user's telephone or other dialing equipment.

However, if the dialed telephone number is a long distance telephone number from the user's location, the rate comparison means associated with the redialing apparatus analyzes the rates in the rate storage means to identify the carrier having the lowest rate for the particular call. Once the lowest rate carrier is identified, the dialing means redials the number through the identified carrier. If the identified carrier is the default carrier, the dialing means simply redials the number in the regular "one-plus" long distance number format. If the identified carrier is a carrier other than the default carrier, the dialing means dials the carrier identification code of the identified carrier prior to the long distance number thereby placing the call through that carrier. Again, once the number is dialed, the redialing apparatus connects the telephone line input through the cut-through means to the line output to allow regular telephone communications between the telephone dialing equipment which the user has used to place the call and the telephone network.

The update means associated with the redialing apparatus periodically causes the dialing means to dial a number for the update database maintained at a remote location and the update means communicates with the update database to receive current long distance rate information. The update means includes a modem for receiving the current long distance rate information and data handling or control mechanism for directing the received information to be stored in the storage associated with the redialing apparatus. An update may be performed in response to a user input made either at the user's own initiative or prompted by a display associated with the redialing apparatus. Alternatively, the update means may be programmable to update automatically according to a desired schedule.

The apparatus according to the invention ensures that long distance calls dialed through the user's telephone dialing equipment are each placed through the lowest cost long distance carrier for the particular call. Rate updates may be performed as frequently as desired to ensure the apparatus operates using accurate long distance rate information.

These and other objects, advantages, and features of the invention will be apparent from the following description of the preferred embodiments, considered along with the accompanying drawings.

DESCRIPTION OF PREFERRED EMBODIMENTS

Figure 1:
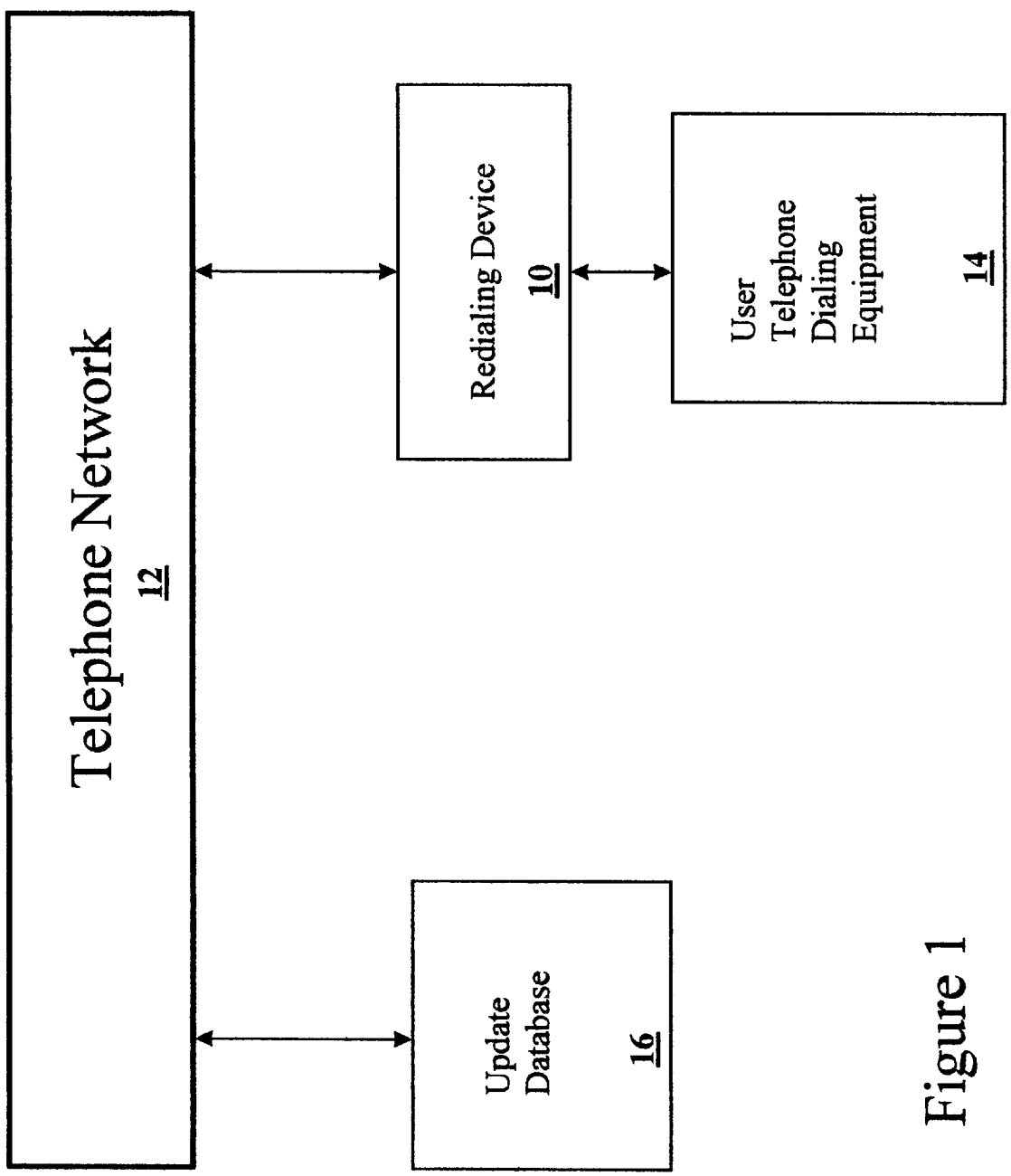
FIG. 1 is a diagrammatic representation of a redialing apparatus connected for operation according to the invention.

Referring to FIG. 1, a redialing apparatus 10 embodying the principles of the invention is connected between a telephone network 12 and a user's telephone dialing equipment 14. The redialing apparatus 10 is adapted to communicate over the telephone network 12 with a current long distance rate database 16 at a remote location. The user's telephone dialing equipment 14 may comprise or include a telephone, facsimile machine, modem, TDD device, or any other device by which a user may dial a long distance number from the user location. The network 12 may be any public telephone network and may be in any format either digital or analog.

Figure 2:
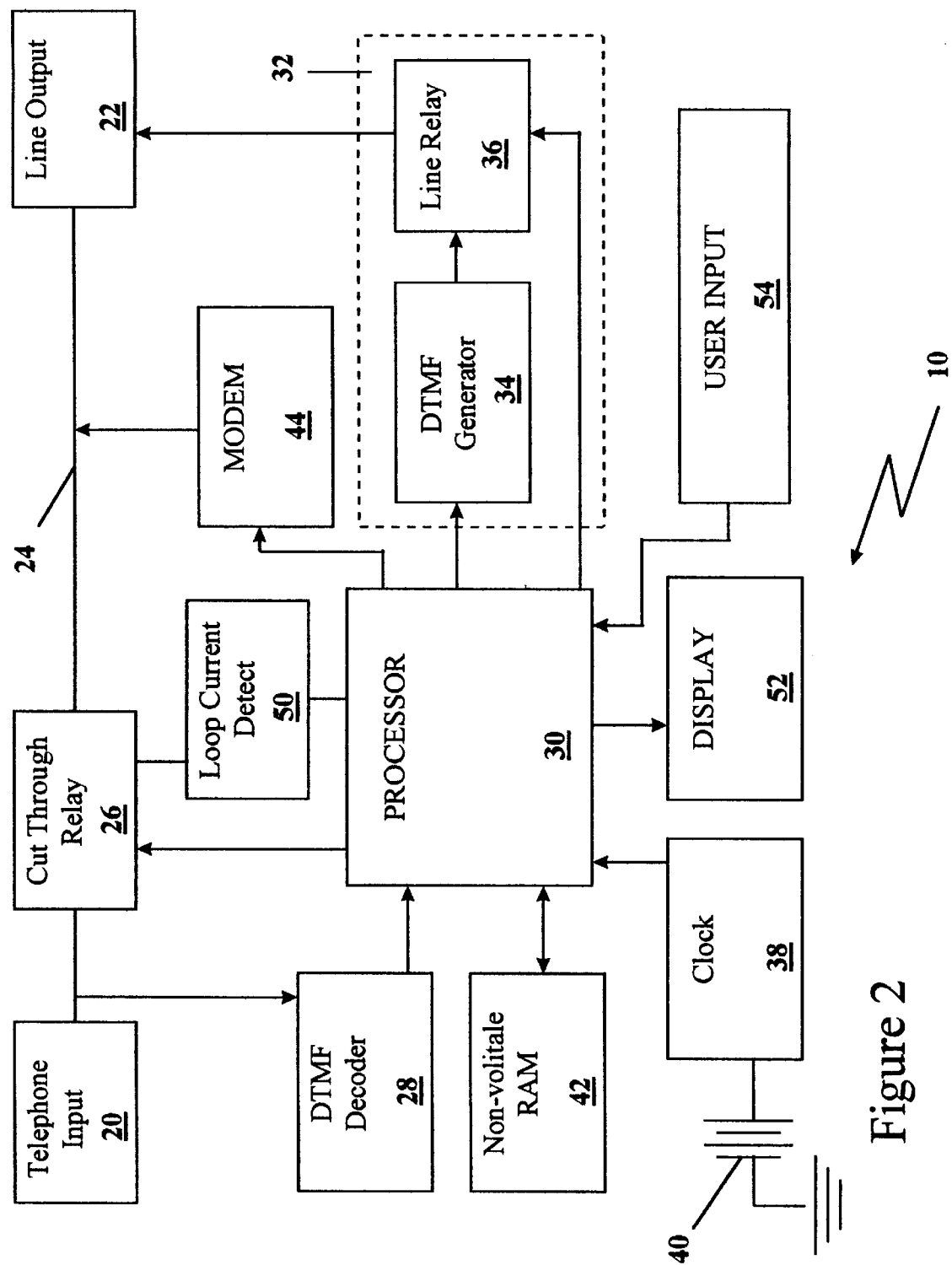
FIG. 2 is a diagrammatic representation of a redialing apparatus embodying the principles of the invention.

FIG. 2 shows one preferred form of the redialing apparatus 10 embodying the principles of the invention. The redialing apparatus 10 shown in FIG. 2 is specifically adapted for regular analog, dual tone modulated frequency (DTMF), or touchtone telephone systems. Those skilled in the art will readily appreciate that a redialing apparatus 10 according to the invention may be adapted for use with digital or other types of telephone systems. The standard DTMF compatible embodiment in FIG. 2 is shown for purposes of illustration and is not intended to limit the scope of the invention only to DTMF phone systems.

The redialing apparatus 10 includes a telephone connector or telephone input 20 and a line output 22. Both the telephone input 20 and line output 22 preferably comprise modular connectors such as RJ9 modular telephone connectors. The telephone input or telephone connector 20 is adapted to be connected by suitable telephone wire to a user's telephone dialing equipment 14 shown in FIG. 1. The line output 22 is adapted to connect to the telephone network shown in FIG. 1 through a regular telephone line. The telephone input 20 and line output 22 are connected to each other through a cut-through line 24. A cut-through relay 26 controls the connection between the telephone input 20 and line output 22.

In the illustrated form of the invention, the redialing apparatus 10 includes a DTMF decoder 28 connected to the telephone input 20. The DTMF decoder 28 represents input number capture means in this form of the invention and operates to capture each telephone number dialed or otherwise applied to the telephone input 20. The DTMF decoder 28 converts the captured number to a digital form and applies the captured number in that form to a processor 30.

The redialing apparatus 10 also includes dialing means 32 comprising a DTMF generator 34 and line relay 36. The DTMF generator 34 is connected to receive an input from the processor 30 and generate a DTMF signal to "dial" a telephone number either alone, or with a carrier identification code as will be discussed with reference to FIGS. 3A, 3B, and 3C below. The DTMF generator 34 is also used to dial the remote update database location for downloading long distance rate information as discussed below. Line relay 36 is under control of the processor 30 and operates to selectively apply the DTMF generator signal to the line output 22 to effect the desired dialing.

The redialing apparatus 10 further includes a clock 38 connected to provide a clock input to the processor 30. The clock 38 is powered by a battery 40 to constantly provide the clock input which includes both time-of-day and day-of-week data since both of these variables affect rates charged by various carriers for long distances services. This real time clock 38 is not to be confused with any system clock which may be associated with the processor 30.

Rate storage means 42 within the redialing apparatus 10 comprises non-volatile, random access memory (RAM) operatively connected to the processor 30. The non-volatile RAM 42 stores long distance rate information for a plurality of carriers and area codes within the service area of the redialing apparatus 10. Also, the non-volatile RAM 42 stores long distance rate information for exchanges within the user's area code, but outside of the user's local call area. In the preferred form of the invention, the long distance rate information is stored in the form of two tables. The first table includes for each area code within the service area of the redialing apparatus 10, daytime, evening, night, and weekend rates for at least the lowest price carrier from the user's location and preferably the top three lowest rate carriers. A carrier identification code (CIC) is associated with each rate in the table and comprises a unique code number to identify and access the particular carrier. The second table is similar to the first except it includes rate information for exchanges within the user's area code which represent a long distance call from the user's location.

The non-volatile RAM 42 also preferably includes rate information for the user's default carrier. This default carrier rate information includes the standard rate for the various times of day and days of week, and also any calling circle rates and telephone numbers, or any other discount service information.

The non-volatile RAM 42 may also be used to store operational software instructions for the processor 30. Alternatively, operational instructions for the processor 30 may be included in memory associated with the processor or in separate memory not shown in FIG. 2.

The redialing apparatus 10 further includes rate comparison means, in this form of the invention implemented in the processor 30. The processor 30 operates under suitable operational software instructions to receive telephone numbers from the DTMF decoder 28, determine if a number is a long distance number, and for each long distance number, identify a lowest rate carrier for the particular call. Once the lowest rate carrier is identified, the rate comparison means or processor 30 then directs the number and any CIC required to access the lowest price carrier to the DTMF generator 34. The processor 30 also controls the cut-through relay 26 and the line relay 36. The operation of the processor 30 to identify the lowest rate carrier is set out with reference to FIGS. 3A, 3B, and 3C below.

The redialing apparatus 10 also includes rate update means for updating the long distance rate information stored in the non-volatile RAM 42. The update means in the illustrated form of the invention comprises a modem 44 and controls for the modem implemented in the processor 30. The modem control comprising a part of the update means causes the processor to selectively dial a telephone number through the DTMF generator 34 to access the remote database 16 (FIG. 1), and then receive data containing current long distance rate information through the modem 44. The modem control also causes the received current long distance information to be stored in the non-volatile RAM 42 overwriting the old data. Preferably, the processor 30 also records an update time and date, as well as the downloaded long distance rate information. The modem 44 performs the function of communicating with the remote database 16 across the network 12 and receive the current long distance rate information for processing by processor 30.

The preferred form of the invention illustrated in FIG. 2 further includes a loop current detector 50, display 52, and user input 54. The loop current detector 50 includes an indicator such as an LED (not shown) to provide an indication when the redialing apparatus 10 is operational. The display 52 may comprise an LCD, LED or other suitable display for displaying the number called and other information to the user. The display 52 may also be used to provide a message to prompt the user to obtain updated long distance rate information from the remote database 16 (FIG. 1). The user input 54 may be included in the device to allow the user to initiate an update sequence in the update means. Alternatively, updating may be initiated through a code input through the telephone or other dialing equipment 14. As a further alternative, the processor may be programmed by suitable means to automatically initiate an update sequence to obtain current long distance rate information.

Those skilled in the art will readily appreciate that the device 10 illustrated in FIG. 2 will also include power connections and a power supply for providing electrical power to the various elements. The device 10 may be battery powered or may include an AC to DC converter for operating off of a standard AC power supply. Since these power connections are well known in the art and are not a part of the invention claimed herein, such connections are omitted from FIG. 2. The form of the invention illustrated in FIG. 2 also preferably includes means (not shown) for passing current through line 24 so that the user's telephone dialing equipment connected to telephone input 20 properly receives incoming calls through line output 22.

Figure 3A:
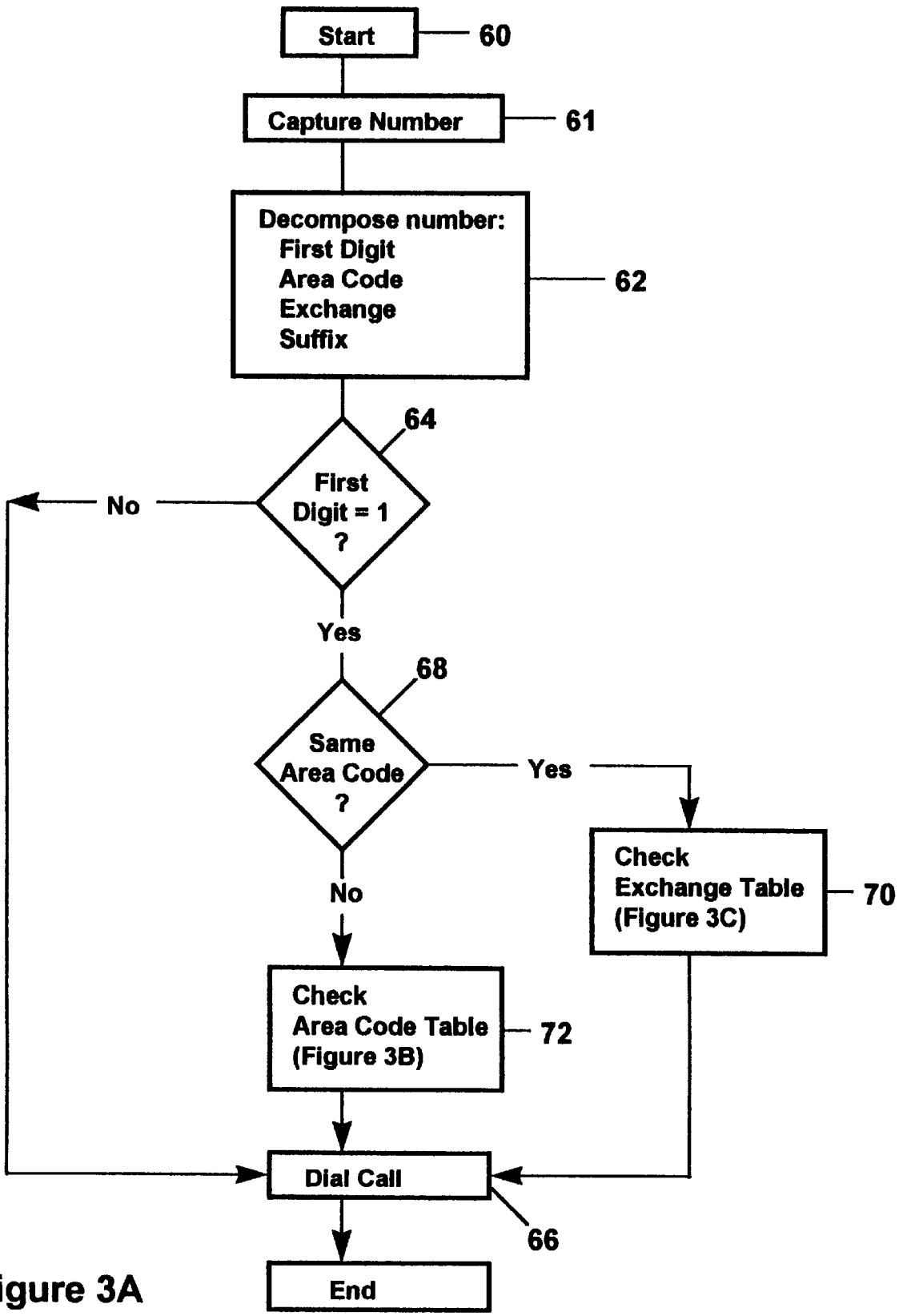
FIGS. 3A, 3B, and 3C are flow diagrams illustrating the operation of the redialing apparatus according to the invention.

The operation of the rate comparison means implemented through processor 30 and the process of the invention may be described with reference to FIG. 2 and particularly, FIGS. 3A, 3B and 3C. Referring to FIG. 3A, the process starts at 60 with the redialing apparatus 10 connected to the user's telephone dialing equipment 14 (FIG. 1) through the telephone input 20 and connected to the telephone network 12 (FIG. 1) through the line output 22. When the user dials a telephone number with the redialing apparatus 10 so connected, and turned on, the dialed number is applied to the telephone input 20. The cut-through relay 26 is opened prior to dialing so that the number does not go directly to the line output 22 and to the network.

The number applied to the telephone input 20 is captured at step 61 by the input capture means. In the preferred form of the invention, the input number capture means comprises the DTMF decoder 28 which decodes the applied DTMF signal and converts the dialed number to a digital representation which is applied to the processor 30.

When the dialed telephone number is applied to the processor 30, the processor at step 62 decomposes the telephone number for anaylsis into a first digit, area code, exchange, and suffix. With the dialed telephone number decomposed, the processor 30 first determines at decision box 64 if the first digit of the number is one. If the first digit is not one, that is, the call is not a long distance call, the processor causes the number to redialed without modification at step 66. In the form of the invention illustrated in FIG. 2, redialing the call at this point comprises applying the digital representation of the dialed number without modification to the DTMF generator 34 with the line relay 36 closed. Once the number is dialed through the DTMF generator 34, the processor 30 opens the line relay 36 and closes the cut-through relay 26 to allow communication between the telephone input 20 and the line output 22 through the cut-through line 24. With the cut-through relay 26 closed, the user may communicate through the telephone network to which the redialing apparatus 10 is connected, just as if the telephone was directly connected to the network.

If the first digit of the dialed number is one, then the call is necessarily a long distance call, and the processor 30 moves to decision box 68 in FIG. 3A. At decision box 68, the processor 30 queries whether the area code is the same as the user's area code. If the area code is the same, the processor 30 goes to the exchange process at 70 to determine the lowest rate carrier for that call. This process 70 is illustrated in FIG. 3C. However, if the area code is different from the user's area code, then the process goes to the area code process 72 to determine the lowest rate carrier for the call.

Once a lowest rate carrier is determined either in the exchange process 70 or the area code process 72, the processor 30 directs the dialing means 32 to dial the number. The number dialed depends upon which carrier is determined to be the lowest carrier for the particular call and may include either the number by itself, or may also include a CIC to place the call through a non-default carrier. In either case, once the number is dialed, the line relay 36 is opened and the cut-through relay 26 is closed to allow communication between the telephone or other device connected to the redialing apparatus 10 and the network 12 (FIG. 1).

Figure 3B:
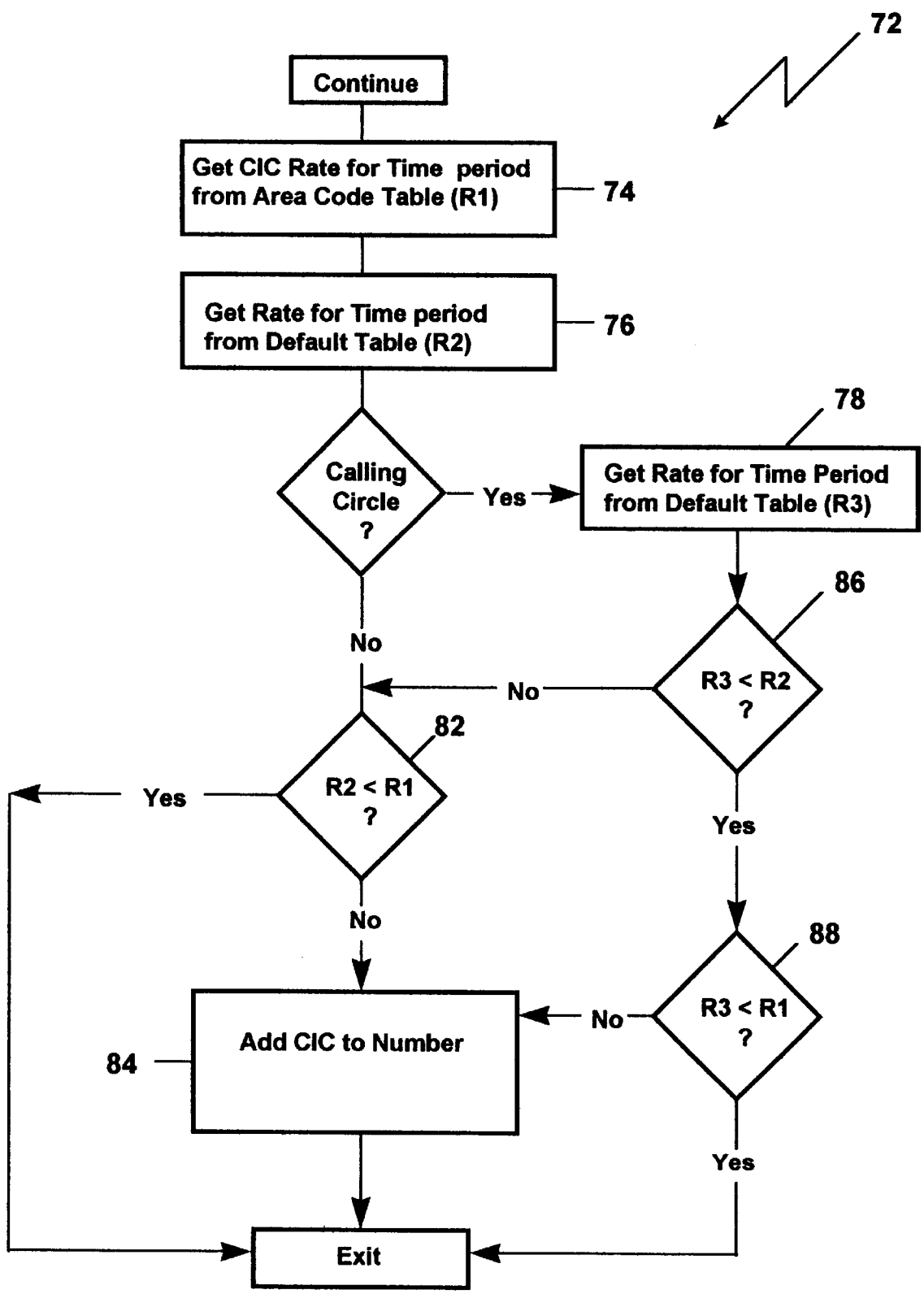

Referring to FIG. 3B, the area code process 72 includes at step 74 retrieving a lowest CIC rate from an area code table stored in the rate storage means 42. The lowest CIC rate is the lowest rate among all non-default carriers for the particular call at the time of the call. At step 76, the area code process 72 retrieves the applicable rate from the default carrier table stored on the storage means 42. Finally, at step 78 if the number is in a calling circle of the default provider, the area code process 72 retrieves the calling circle rate from the default carrier table stored in storage means 42.

At this point, all rates required to determine the lowest rate for the particular call have been retrieved from storage means 42. The rate comparison means implemented in processor 30 must now determine the lowest of the retrieved rates. When no calling circle applies, the process at decision box 82 compares the low CIC rate R1 and the default carrier rate R2. If the is default carrier rate R2 is lower, the process simply exits to redial the number as dialed by the user, thereby using the default carrier for the call. This dialing step is illustrated at step 66 in FIG. 3A. However, if the low CIC rate R1 is lower than the default carrier rate R2 at decision box 82, then the process at step 84 adds the CIC for the identified carrier to the dialed number and exits the process to the dial step 66 in FIG. 3A.

When calling circle rates apply, determining the lowest rate becomes a two step process. First, the process determines at step 86 if the calling circle rate R3 is less than the regular default rate R2 and, if not, goes to decision box 82. If the calling circle rate R3 is less than the regular default rate R2, the process goes to decision box 88. At decision box 88, the process compares the calling circle rate R3 to the low CIC rate R1 and if the calling circle rate is lower, exits the process to the dialing step 66 in FIG. 3A. Exiting the process at this point causes the dialing means 32 to simply redial the number through the default carrier. However, if the calling circle rate R3 is higher than the low CIC rate R1, then the process at step 84 adds the CIC of the identified carrier to the telephone number to be dialed prior to exiting the process for dialing at step 66 of FIG. 3A.

Figure 3C:
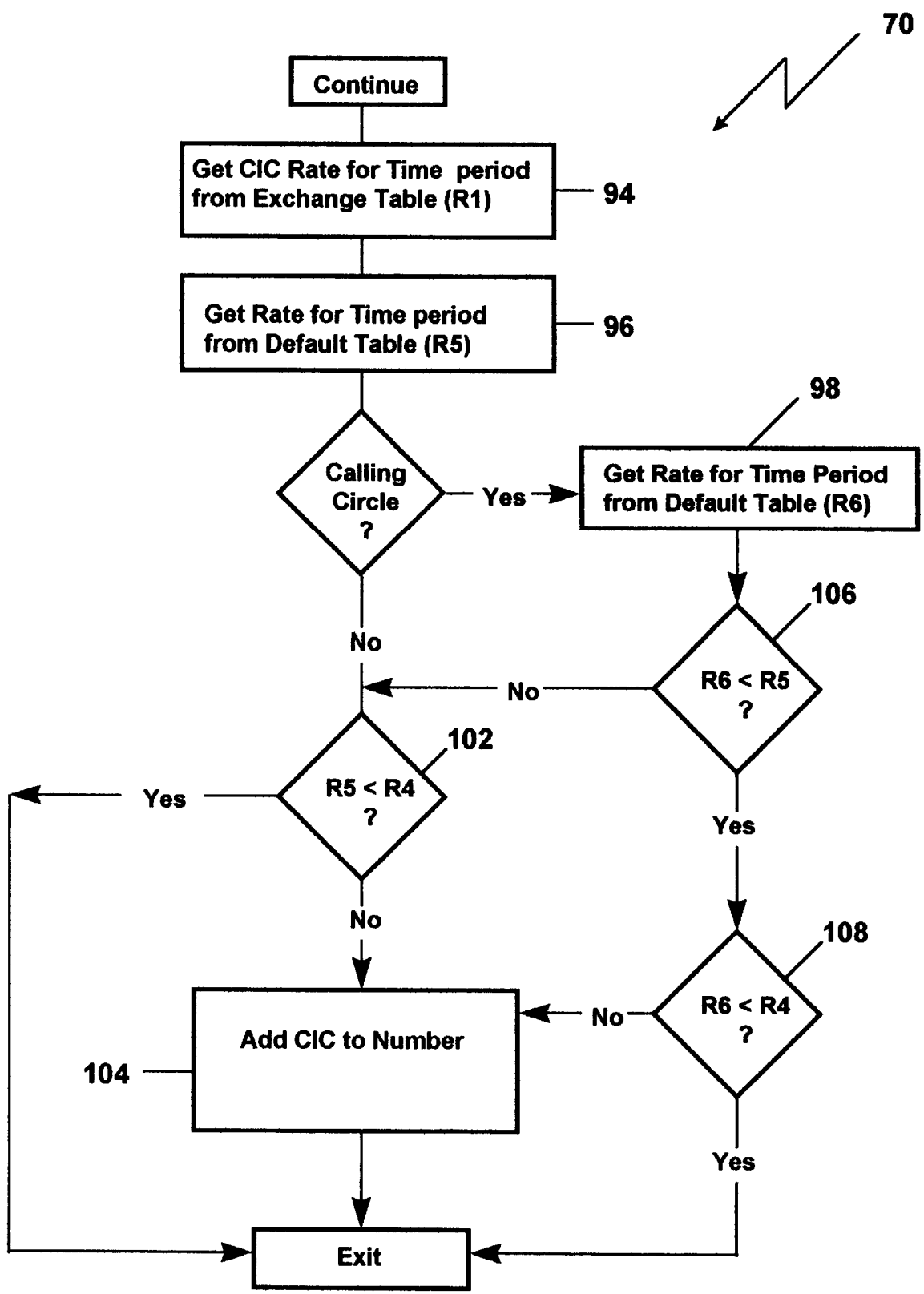

Referring now to FIG. 3C, the exchange process 70 applies if the call is a long distance call and is within the user's area code as determined at decision box 68 in FIG. 3A. The separate process 70 is required because the long distance rates for calls within the same area code commonly differ from the rates to numbers outside the user's area code. The rates for these long distance calls within the user's area code are determined by the exchange of the target number, that is, the number being called. The process 70 of identifying the lowest rate is identical to the process 72 shown in FIG. 3B except that retrieval step 94 obtains the low CIC rate R4 for the particular time from a CIC exchange table of the long distance information rather than the CIC area code table. Also, the default rates R5 and R6 are retrieved at step 96 and 98 from default tables for various exchanges in the local area code rather than a default table for calls to other area codes.

Similarly to the process 72 shown in FIG. 3B, if a calling circle does not apply through the default carrier, the process 70 includes simply comparing a low CIC rate R4 to the default rate R5 at decision box 102. If the default rate R5 is lower, the process 70 exits and returns to the dialing step 66 shown in FIG. 3A. However, if no calling circle applies and the low CIC rate R4 is lower than the default rate R5, the process 70 goes through the step 104 of adding the CIC identified carrier to the dialed number and then exiting the process to the dialing step 66 shown in FIG. 3A. If a calling circle rate R6 applies, the process 70 shown in FIG. 3C first compares the calling circle rate to the regular default rate at decision box 106, and if the calling circle rate R6 is higher, branches to decision box 102. If the calling circle rate R6 is lower, the process goes to decision box 108 to compare the calling circle rate R6 to the low CIC rate R4. If the calling circle rate R6 is lower the process exits to the dialing step 66 shown in FIG. 3A. If the low CIC rate R4 is lower than the calling circle rate R6, then the process 72 goes to step 104 and adds the CIC of the identified carrier to the dialed number prior to exiting to step 66 in FIG. 3A.

The embodiment of the invention shown in FIG. 2 and the DTMF dialing step described with reference to FIG. 3A illustrates one preferred form of the invention. However, the invention is not limited to use with telephone dialing equipment producing DTMF signals. For example, in a digital telephone dialing system, the captured telephone number would already be in a digital format and would not have to be decoded prior to use by the processor 30. Also, a DTMF generator would not be required to "redial" the captured number to the line output 22.

Also, those skilled in the art will readily appreciate that numerous arrangements may be used to provide the control and process steps performed by the processor 30. The processor 30 may comprise a general purpose processor which is programmed appropriately to perform the required analysis and control functions. Alternatively, the processor 30 may be a special purpose processor or array of logic circuits capable only of performing the required comparison and control steps. Furthermore, the rate update need not be obtained over the telephone network. Rather, update data may be obtained across any suitable communications system available between the user's location and the remote database.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for placing a toll telephone call using a lowest cost long distance carrier, the apparatus comprising:

(a) a telephone input for operatively connecting to a user's telephone dialing equipment;

(b) a line output for operatively connecting to a public telephone network;

(c) input number capture means connected to the telephone input for capturing telephone numbers dialed from the user's telephone dialing equipment;

(d) rate storage means for storing long distance rate information comprising long distance rates and a carrier identification code for a plurality of alternative carriers, and default carrier rates for the user's default long distance carrier, each rate specifying a rate applicable from the location of the user's telephone dialing equipment to another location within a long distance service area;

(e) a clock for producing a time input representing the time of day and day of week;

(f) rate comparison means connected to the rate storage means, the clock, and input number capture means for determining from the long distance rate information stored in the rate storage means a comparison rate set comprising for the current time, a lowest alternative carrier rate and a default rate to a toll telephone number captured by the input means, for comparing the rates comprising the comparison rate set to determine the identity of the long distance carrier having the lowest long distance rate to the toll telephone number captured by the input number capture means, and, when the long distance carrier having the lowest long distance rate to the toll telephone number is not the default carrier for adding a carrier identification code to be dialed with the toll telephone number;

(g) dialing means connected to the rate comparison means for redialing the toll telephone number to the line output along with any carrier identification code added by the rate comparison means.

(h) cut-through means for operatively connecting the telephone input to the line output after the dialing means redials the toll telephone number; and (i) rate update means connected to the rate storage means and to the line output for receiving an update signal and in response to the update signal communicating with a remote location over the public telephone network to receive from the remote location current long distance rate information, the rate update means also for directing the current long distance rate information to the rate storage means for storage.

2. The apparatus of claim 1 wherein the input number capture means comprises:

(a) a dual tone modulated frequency decoder for decoding a dual tone modulated frequency signal representing the number dialed from the user's telephone dialing equipment and producing a digital representation of the number dialed from the user's telephone dialing equipment.

3. The apparatus of claim 1 wherein the input number capture means is also for capturing each telephone number dialed from the user's telephone dialing equipment.

4. The apparatus of claim 3 wherein:
(a) the rate comparison means is also for determining whether the telephone number captured by the input number means represents a toll call or a non-toll call; and
(b) the dialing means is also for redialing to the line output the telephone number representing the non-toll call.

5. The apparatus of claim 1 wherein the dialing means comprises:
(a) a dual tone modulated frequency generator for receiving a digital representation of a telephone number and generating a dual tone modulated frequency signal representative of the telephone number.

6. The apparatus of claim 1 wherein the cut-through means comprises:
(a) a cut-through relay positioned in a cut-through line connecting the telephone input and the line output, the cut-through relay having an open position leaving an open circuit through the cut-through line and a closed position in which the circuit through the cut-through line between the telephone input and the line output is closed thereby enabling telephone communications between the telephone input and the line output.

7. The apparatus of claim 1 wherein the rate comparison means comprises:
(a) a processor programmed to receive each telephone number captured by the input number capture means and decompose the number into a first digit, area code, exchange, and suffix, and further programmed to access the long distance rate information in the rate storage means to determine the comparison rate set for each toll telephone number captured by the input number capture means.

8. The apparatus of claim 7 wherein the rate update means comprises:
(a) a modem operatively connected to the processor, and the processor is further programmed to generate the update signal in response to a user input, the update signal causing the dialing means to dial an update telephone number, controlling the modem to communicate with the remote location across the telephone network, and directing the rate storage means to store the current long distance rate information received from the remote location.

9. The apparatus of claim 1 wherein the rate comparison means is also for determining whether a special default rate applies to the toll telephone number captured by the input number capture means, and, when the special default rate applies, the comparison rate set also includes the special default rate.

10. A method for placing a toll telephone call from telephone dialing equipment at a user location using a lowest cost long distance carrier, the method comprising the steps of:
(a) capturing a telephone number dialed from the user's telephone dialing equipment and the current time from a clock at the user location;
(b) analyzing stored long distance rate information with a processor at the user location to determine for the current time a comparison rate set comprising a lowest alternative carrier rate and a default rate to the captured telephone number, the stored long distance rate information comprising information on long distance rates for a default carrier and information on long distance rates and a carrier identification code for a plurality of alternative carriers, each rate specifying a rate applicable from the user location to another location within a service area and outside of the local call area for the user;
(c) comparing the rates comprising the comparison rate set to determine the identity of the long distance carrier having the lowest long distance rate to the captured telephone number;
(d) producing dialing instructions with the processor and directing the dialing instructions to a dialer, the dialing instructions including the carrier identification code associated with the lowest alternative carrier rate when the lowest long distance rate to the captured telephone number comprises the lowest alternative carrier rate; and
(e) in response to the dialing instructions from the processor, dialing to a line output the carrier identification code associated with the lowest alternative carrier rate when the lowest long distance rate to the captured telephone number comprises the lowest alternative carrier rate, and redialing the captured telephone number.

11. The method of claim 10 further comprising the steps of:
(a) analyzing the captured telephone number to determine whether a special default rate applies for the number; and
(b) if the special default rate applies, adding the special default rate to the comparison rate set.

12. The method of claim 10 further comprising the steps of:
(a) in response to an update signal, making a connection between a remote location and a modem at the user location, the connection being made through a communications network;
(b) receiving the long distance rate information from the remote location through the modem; and
(c) storing the long distance rate information in digital form at the user location.

13. The method of claim 10 wherein the step of analyzing the stored long distance rate information comprises:
(a) decomposing the captured telephone number into a first digit, area code, exchange, and suffix, and for each captured telephone number having the same area code as the user location, searching for the lowest alternative carrier rate in an exchange table within the long distance rate information, and for each captured telephone number having a different area code from the area code at the user location, searching for the lowest alternative carrier rate in an area code table within the long distance rate information.

14. The method claim 10 further comprising the step of:
(a) making a connection between the user's telephone dialing equipment at the user location and the line output after redialing the captured telephone number.

* * * * *